United States Patent [19]

Marzoug

[11] Patent Number: 5,768,687
[45] Date of Patent: Jun. 16, 1998

[54] MODELING INTERFERENCE IN A CELLULAR RADIOTELEPHONE NETWORK

[75] Inventor: Mongi Marzoug, Bagneux, France

[73] Assignee: France Telecom, Paris, France

[21] Appl. No.: 724,868

[22] Filed: Oct. 3, 1996

[30] Foreign Application Priority Data

Oct. 3, 1995 [FR] France ................... 95 11695

[51] Int. Cl.$^6$ ........................................ H04B 1/10
[52] U.S. Cl. ........................ 455/63; 455/67.1; 455/501
[58] Field of Search ........................ 455/422, 63, 9, 455/501, 524, 67.1, 67.4, 226.1, 226.3; 370/252

[56] References Cited

U.S. PATENT DOCUMENTS

| | | | |
|---|---|---|---|
| 5,574,979 | 11/1996 | West | 455/67.1 |
| 5,596,570 | 1/1997 | Soliman | 455/501 |
| 5,603,093 | 2/1997 | Yashimi et al. | 455/63 |
| 5,613,198 | 3/1997 | Ahmadi et al. | 455/63 |
| 5,651,028 | 7/1997 | Harris et al. | 455/63 |
| 5,661,491 | 8/1997 | Jones | 455/63 |

*Primary Examiner*—Reinhard J. Eisenzopf
*Assistant Examiner*—Edan Orgad
*Attorney, Agent, or Firm*—Lowe Hauptman Gopstein & Berner

[57] ABSTRACT

In a cellular radiotelephone network comprising cells served by respective base stations, the modeling of interference includes selecting a first frequency in the frequency spectrum allocated to the network, selecting a point of the network at which radio signals emitted at least at the first frequency of the spectrum from the base stations are received in accordance with a propagation model, assigning respective coefficients to the received radio signals, a coefficient being equal to 1 if the selected frequency is allocated to a base station emitting one of the received radio signals, and equal to 0 otherwise, and multiplying the radio signals by the respective coefficients to derive products that are summed to yield an interference model.

6 Claims, 6 Drawing Sheets

5,768,687

1

MODELING INTERFERENCE IN A CELLULAR RADIOTELEPHONE NETWORK

BACKGROUND OF THE INVENTION

1. Field of the Invention

The present invention relates to cellular radiotelephone networks, and in particular the allocation of frequencies within a frequency band allocated to a cellular radiotelephone network to the cells of the radiotelephone network.

2. Description of the Prior Art

A given frequency band is conventionally allocated to a cellular radiotelephone network. Because of the restricted number of frequencies available, the same frequency must be allocated to plural cells of the network, i.e. used simultaneously by the respective base stations of the cells to emit radiotelephone signals, which causes interference between signals sent on the same frequency or on similar frequencies by different base stations. Frequency allocation is a complex combinatorial problem that must satisfy contradictory criteria, in particular handling all of the telephone traffic whilst restricting interference.

A known method models the interference by means of a compatibility matrix that indicates for the cells of the network considered in pairs the minimal frequency offset that must exist between the frequencies allocated to the two cells for interference between the two cells to remain below a threshold.

This method takes account of only the interference due to the cells considered in pairs, whereas in reality the interference due to all of the cells is cumulative.

Moreover, the compatibility matrix supplies only a binary indication, namely that either the compatibility or the incompatibility of the frequencies allocated to a given two cells of the network, and give no information as to the exact level of interference. Modeling of interference by means of a compatibility matrix is usable when the problem is allocation of frequencies subject to the criterion of minimizing the number of frequencies used in the cellular radiotelephone network, which is a situation of little practical use.

OBJECTS OF THE INVENTION

The main object of the invention is to remedy the previously mentioned drawbacks.

Another object of the invention is to provide a method of modeling interference that allows for multiple sources of interference whilst providing a simple formula for frequency allocation which can then be resolved in accordance with a selected criterion, for example maximizing radiotelephone traffic or minimizing interference or maximizing spectral efficiency or minimizing the number of used frequencies.

SUMMARY OF THE INVENTION

Accordingly, the invention is directed to a method of modeling interference in a cellular radiotelephone network comprising cells served by respective base stations, wherein a frequency spectrum comprising a finite number of frequencies is allocated to the network and a propagation model indicates radio signals respectively emitted at each frequency of the spectrum from the base stations of the network and received at a point of the network.

According to a first embodiment, the method comprises:

selecting a selected frequency in the spectrum allocated to the cellular radiotelephone network, selecting in the network a selected point for which the propagation model is determined,

2 assigning respective coefficients to the radio signals at the selected frequency received at the selected point, one of the coefficients being equal to 1 if the selected frequency is allocated to a base station emitting a respective one of the radio signals, and equal to 0 otherwise, multiplying the radio signals at the selected frequency received at the selected point by the respective coefficients into respective products, and summing the respective products to yield an interference model.

The invention is not directed to a calculation of interference, but takes into account of interference to allocate frequencies in a cellular radiotelephone network in an optional way. The sum of interference at the selected point depends upon of the coefficients of a frequency allocation plan thereby optimizing allocation of frequencies to the base stations in the network as a function of a selected criterion.

Preferably, the method further comprises dividing the first interference model by the signal emitted at the selected frequency from the base station serving the point of the network. This first embodiment takes into account of co-channel interference.

In other words, the interference-to-useful-signal ratio, and not the known signal-to-interference ratio, is derived to obtain a linear formulation of the single and multipath interference on each radio channel as a function of the coefficient of a frequency allocation plane.

According to a second embodiment, the method comprises:

(a) selecting a first selected frequency and second selected frequencies in the spectrum allocated to the cellular radiotelephone network, (b) selecting in the network a selected point for which the propagation model is determined, (c) for each of the first selected frequency and second selected frequencies:

assigning coefficients respectively to the radio signals at the each selected frequency received at the selected point, each the respective coefficient being equal to 1 if the each selected frequency is allocated to a base station emitting a respective one of the radio signals, and equal to 0 otherwise, multiplying the radio signals at the each selected frequency received at the selected point by the respective coefficients into respective products, and summing the respective products to derive a first interference model, (d) assigning interference ratios respectively to the first interference models respectively derived for the first and second selected frequencies, the interference ratio relative to a respective first interference model being a function of the difference between the first selected frequency and the respective second selected frequency, except for the interference ratio relative to said first selected frequency which is equal to 1, (e) multiplying the first interference models respectively by the interference ratios into model products, and (f) summing the model products to yield a second interference model.

This second embodiment includes co-channel interferences and adjacent-channel interferences.

According to a third embodiment, the method comprises:

(a) selecting a selected frequency in the spectrum allocated to the cellular radiotelephone network, (b) selecting plural selected points in the network situated in the same cell, propagation models being respectively determined for the selected points,

3

(c) for each the selected point:
  assigning respective coefficients to the radio signals at the selected frequency received at the selected point, one of the coefficients being equal to 1 if the selected frequency is allocated to a base station emitting a respective one of the radio signals, and equal to 0 otherwise,
  multiplying the radio signals at the selected frequency received at the selected point by the respective coefficients into respective products, and
  summing the respective products to derive a first interference model, (d) averaging the first interference models respectively derived for the selected points to yield a second interference model.

This third embodiment reduces the number of interference constraints, typically from a few hundred points per cell to a few points per cell. Furthermore, some propagation models do not give the radio signals received at points of the network, but only averages which can then be used in this embodiment.

BRIEF DESCRIPTION OF THE DRAWINGS

The foregoing and other objects, features and advantages of the invention will be apparent from the following detailed description of several embodiments of the invention with reference to the corresponding accompanying drawings in which.

DESCRIPTION OF THE PREFERRED EMBODIMENTS

Figure 1:
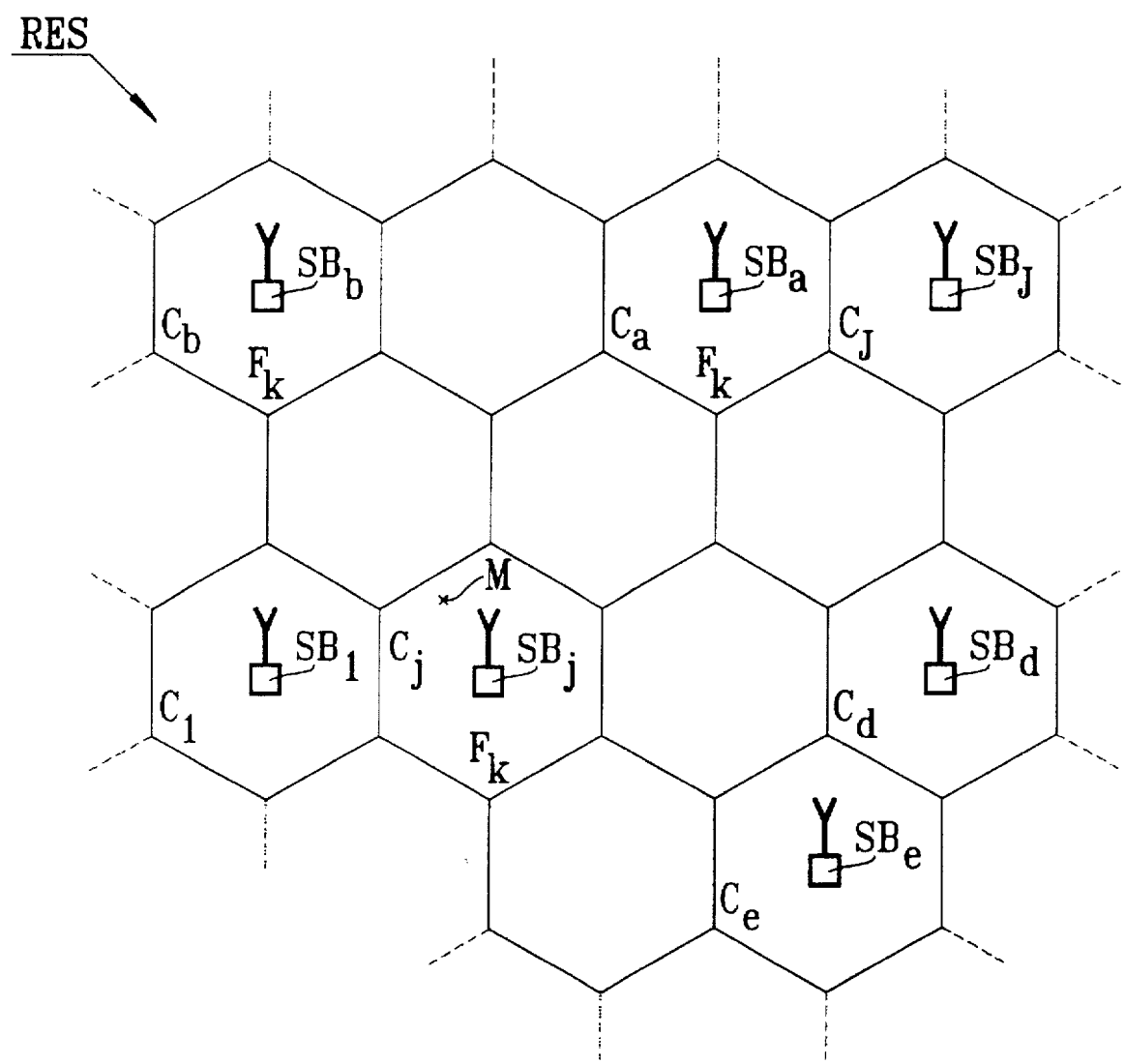
FIG. 1 shows part of a prior art cellular mobile radio network.

Referring to FIG. 1, a cellular radiotelephone network RES comprises a set of cells $\{C_j, 1 \leq j \leq J\}$ where J is a positive integer. The network RES is the GSM ("Global System for Mobile communications") pan-european digital cellular network, for example.

The cells $C_1$ through $C_J$ are associated with respective base stations $SB_1$ through $SB_J$. A cell $C_j$ with j between 1 and J, comprises a base station $SB_j$ through which a mobile station sets up and receives radiotelephone calls. The remainder of the description is more particularly concerned with the radiotelephone signals emitted by the base stations $SB_1$ through $SB_J$.

By way of example, FIG. 1 shows cells $C_a$, $C_b$, $C_d$, $C_e$ and $C_j$ associated respectively with base stations $SB_a$, $SB_b$, $SB_d$, $SB_e$, and $SB_j$ where a, b, d, e and j are integers lying between 1 and J.

A frequency spectrum $\{F_k, 1 \leq k \leq K\}$ is allocated to the cellular radiotelephone network RES, where K is a positive

4 integer. The frequency spectrum is a series of discrete values uniformly distributed within a given frequency band. Prior to commissioning the cellular radiotelephone network RES, or at the time of periodic reorganization thereof, it is necessary to allocate one or more frequencies selected in the spectrum to each of the base stations of the network. In practice, between one and seven frequencies are allocated to each cell in the GSM network. If the frequency $F_k$, where k is an integer lying between 1 and K, is allocated to the cell $C_j$, the combination ($C_j$, $F_k$) forms one radiotelephone channel.

The allocation of frequencies to the cells must satisfy two contradictory criteria. Sufficient frequencies must be allocated to handle the traffic but the interference between the signals emitted must be limited.

At any point M in the network, within the cell $C_j$, for example, a receiver of a mobile station receives a sum of signals emitted by the J base stations $SB_1$ through $SB_J$ of the network.

A predetermined propagation model supplies signals $P_{1,k}$ through $P_{J,k}$ received at the point M and emitted at the frequency $F_k$ from the base stations $SB_1$ through $SB_J$ of the network. All of the signals are expressed in power terms.

The propagation signals are obtained by calculation or by measurement.

The sum of the signals emitted at the frequency $F_k$ and received at the point M at the same frequency $F_k$ is expressed in the form:

$$\sum_{i=1}^{J} x_{i,k} \cdot P_{i,k}$$

where $x_{i,k}$ has the value 1 if the frequency $F_k$ is allocated to the base station $SB_i$ and $X_{i,k}$ has the value 0 if the frequency $F_k$ is not allocated to the base station $SB_i$. The set of the coefficients $X_{i,k}$ for $1 \leq i \leq J$ and $1 \leq k \leq K$ defines a frequency allocation plan for the network. The frequency allocation plan for the network is the solution to the problem of allocating frequencies and indicates the frequency or frequencies allocated to each of the base stations of the network.

On the other hand, the sum of the signals at the frequency $F_k$ received at the point M may be expressed in the following manner:

$$SU_{j,k} + I_k$$

where $SU_{j,k}$ is a useful signal emitted at the frequency $F_k$ from the base station $SB_j$ and received at the point M in the cell $C_j$, with $SU_{j,k} = P_{j,k}$ and $I_k$ is a sum of interference signals emitted at the frequency $F_k$ from the other base stations of the network and received at the point M in the cell $C_j$.

The sum of the signals at the frequency $F_k$ received at point M is then:

$$SU_{j,k} + I_k = \sum_{i=1}^{J} x_{i,k} \cdot P_{i,k} \quad (1)$$

If the frequency $F_k$ is allocated to the cell $C_j$, the useful signal $SU_{j,k}$ is not null.

Equation (1) is then written:

$$1 + \frac{I_k}{SU_{j,k}} = \sum_{i=1}^{J} x_{i,k} \cdot \frac{P_{i,k}}{SU_{j,k}}$$

Thus, at the point M, the ratio of the sum of the interference due to the signals emitted at the frequency $F_k$ and the useful signal at the frequency $F_k$ is expressed in the form of a linear function of variables $x_{i,k}$ with $1 \leq i \leq J$.

For example, if the frequency $F_k$ is allocated to the cells $C_a$, $C_b$ and $C_j$, as shown in FIG. 1, the following equality is verified at point M:

$$1 + \frac{I_k}{SU_{j,k}} = \frac{1}{SU_{j,k}} \cdot (P_{a,k} + P_{b,k} + P_{j,k})$$

The terms $P_{a,k}$, $P_{b,k}$ and $P_{j,k} = SU_{j,k}$ are supplied by the propagation model at the point M.

Figure 2:
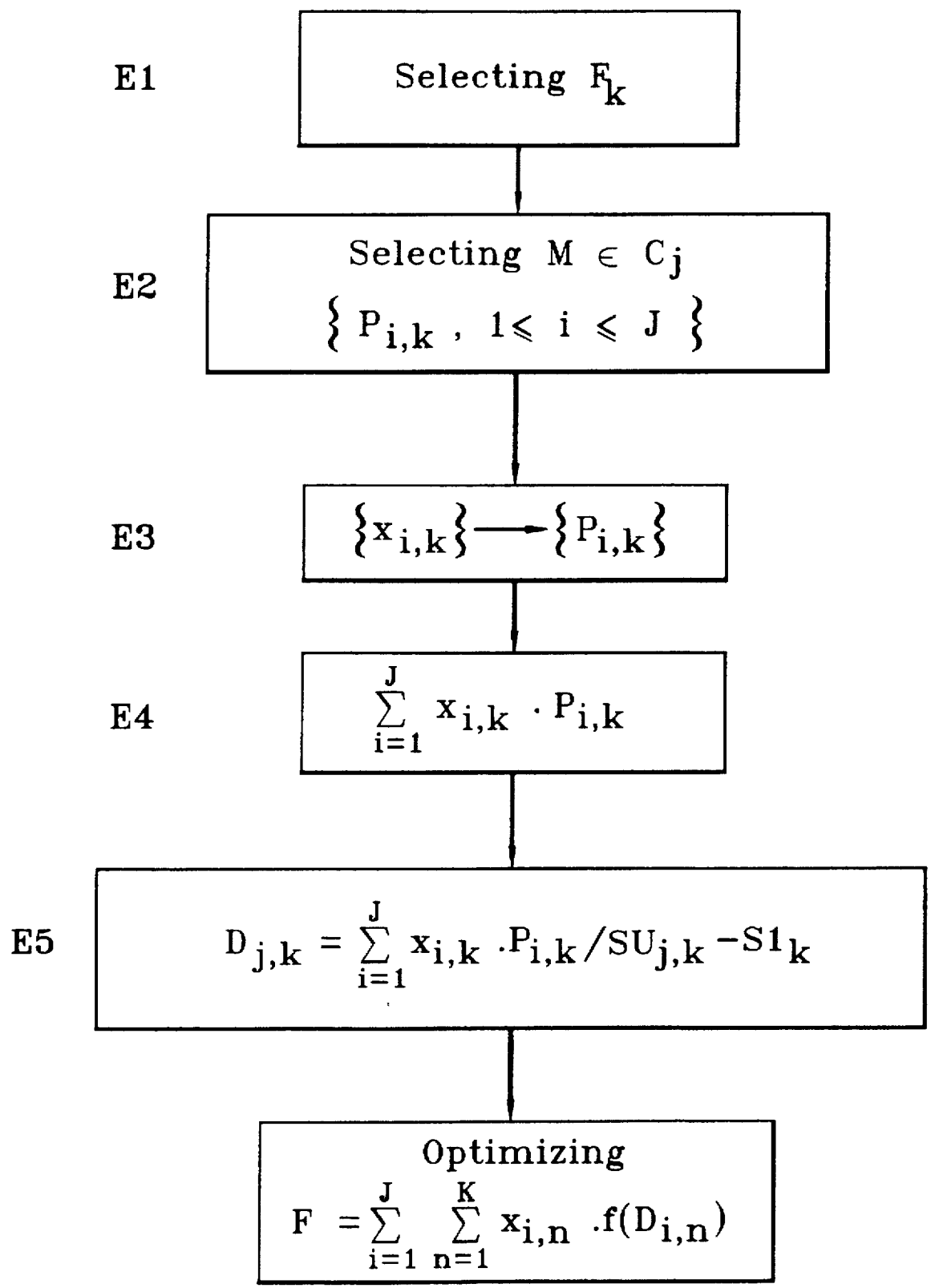
FIG. 2 shows an algorithm for modeling interference in a cellular radiotelephone network embodying a first embodiment of the invention.

Referring to FIG. 2 and according to a first embodiment of the invention, an algorithm for modeling interference due to the signals emitted at the frequency $F_k$ by the base stations $SB_1$ through $SB_J$ of the network RES and received at the point M comprises five steps E1 through E5.

Step E1 is the selection of the frequency $F_k$ from the frequencies $F_1$ through $F_K$.

In step E2 the point M in the cell $C_j$ is selected. The propagation model is known at the point M and provides the signals $P_{1,k}$ through $P_{J,k}$.

Step E3 assigns the coefficients $x_{1,k}$ through $x_{J,k}$ to the signals $P_{1,k}$ through $P_{J,k}$. In other words, the frequency $F_k$ is allocated to predetermined cells of the network RES.

In step E4 the signals $P_{1,k}$ through $P_{J,k}$ are multiplied by respective coefficients $x_{1,k}$ through $x_{J,k}$ and the sum of the products obtained in this way is calculated.

In step E5 the sum obtained in step E4 is put into the form previously indicated:

$$1 + \frac{I_k}{SU_{j,k}} = \sum_{i=1}^{J} x_{i,k} \cdot \frac{P_{i,k}}{SU_{j,k}}$$

in order to subtract from it a predetermined threshold $S1_k$. If the sum $$1 + \frac{I_k}{SU_{j,k}}$$

is less than or equal to the threshold $S1_k$, the coefficients $x_{1,k}$ through $x_{J,k}$ assigned in step E3 correspond to interference that is compatible with correct operation of the network.

If the sum $$1 + \frac{I_k}{SU_{j,k}}$$

is greater than the predetermined threshold $S1_k$, this means that the coefficients $x_{1,k}$ through $x_{J,k}$ assigned in step E3 are badly chosen.

Division by the signal $SU_{j,k}$ in step E5 has the advantage that the sums and therefore the threshold $S1_k$ are dimensionless quantities. Division by the signal $SU_{j,k}$ is optional, however.

In one variant of the first embodiment, the step E5 includes the calculation of the difference:

$$D_{j,k} = 1 + \frac{I_k}{SU_{j,k}} - S1_k = \sum_{i=1}^{J} x_{i,k} \cdot \frac{P_{i,k}}{SU_{j,k}} - S1_k$$

The difference $D_{j,k}$ is to be minimized.
A function $f(D_{j,k})$ is selected, for example equal to:

$$F(D_{j,k}) = e^{a \cdot D_{j,k}}$$

where a is a positive real number.
The function to be minimized to optimize the frequency allocation plan for the network is:

$$\sum_{i=1}^{J} \sum_{n=1}^{K} x_{i,n} \cdot e^{a \cdot D_{i,n}}.$$

In a second embodiment, the interference taken into account is not only the interference due to the signals emitted at the frequency $F_k$, called co-channel interference, but also the interference due to signals transmitted at all the frequencies $F_1$ through $F_K$ of the spectrum, which are summed to produce a sum $II_k$.

For the second embodiment, equation (1) becomes:

$$SU_{j,k} + II_k = \sum_{n=1}^{K} \sum_{i=1}^{J} x_{i,n} \cdot R_{k,n} \cdot P_{i,n}$$

In this equation, $R_{k,n}$ is a ratio of interference between the frequencies $F_k$ and $F_n$. The ratio $R_{k,n}$ depends on the difference between the frequencies $F_k$ and $F_n$. To give a first example, $R_{k,n} = 1$ if $n = k$,
$R_{k,n} = 0.01$ if $n = k-1$ or $n = k+1$, and
$R_{k,n} = 0$ if $n \neq k$, $n \neq k-1$ and $n \neq k+1$.
To give a second example, for the GSM network,
$R_{k,n} = 1$ if $n = k$,
$R_{k,n} = 10^{-1.8}$ if $n = k-1$ or $n = k+1$,
$R_{k,n} = 10^{-5}$ if $n = k-2$ or $n = k+2$,
$R_{k,n} = 10^{-20}$ if $n = k-3$ or $n = k+3$, and
$R_{k,n} = 0$ in all other cases.

On dividing by the useful signal $SU_{j,k}$, as previously, the above equation becomes:

$$1 + \frac{II_k}{SU_{j,k}} = \sum_{n=1}^{K} \sum_{i=1}^{J} x_{i,n} \cdot \frac{R_{k,n} \cdot P_{i,n}}{SU_{j,k}}.$$

At point M the ratio of the sum of the interference due to the signals transmitted at all the frequencies in the spectrum allocated to the network RES and the useful signal at frequency $F_k$ is expressed in the form of a linear function of variables $x_{i,k}$, with $1 \leq i \leq J$ and $1 \leq k \leq K$.

Figure 3:
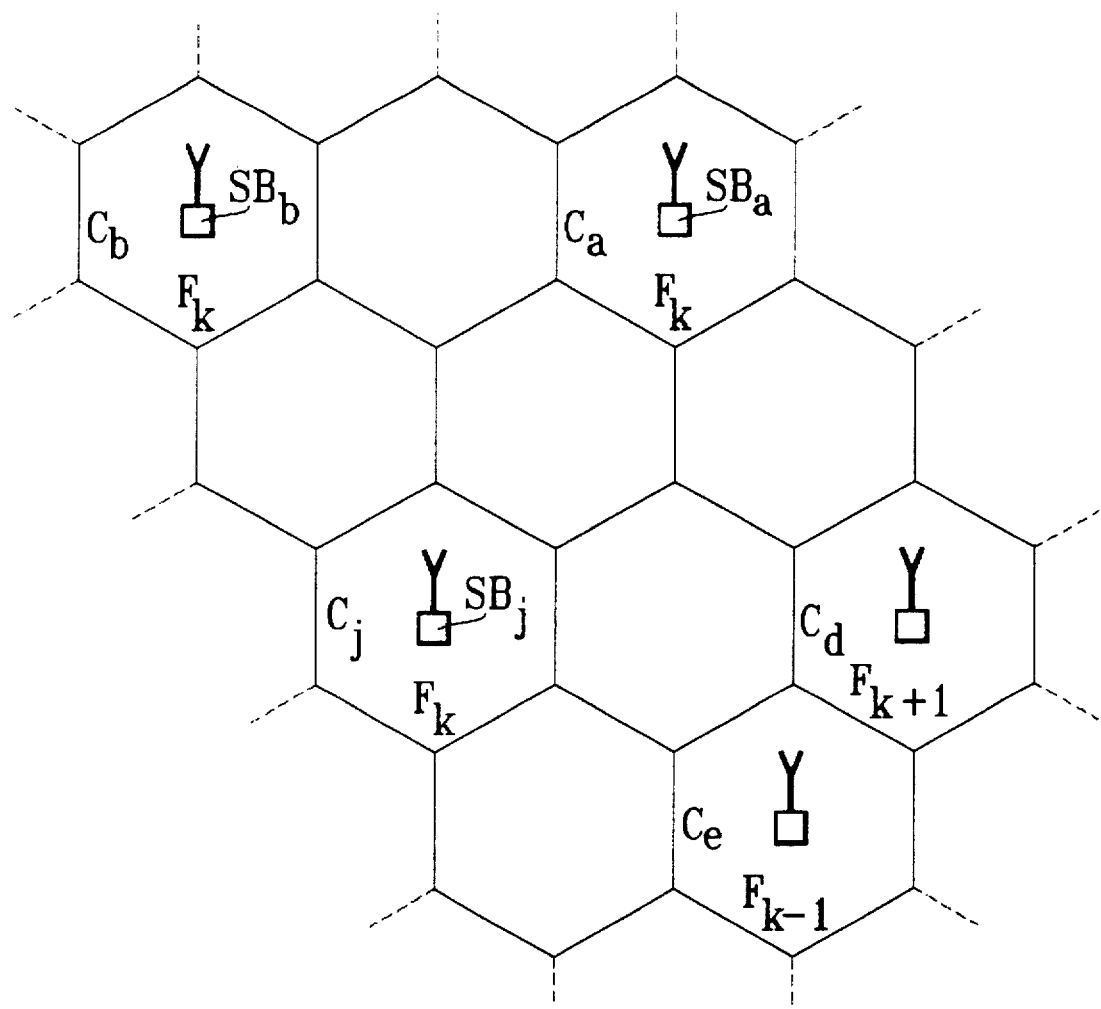
FIG. 3 shows part of a prior art cellular radiotelephone network.

Referring to FIG. 3, and by way of example, the frequency $F_k$ is allocated to the cells $C_a$, $C_b$ and $C_j$, the frequency $F_{k-1}$ is allocated to the cell $C_e$ and the frequency $F_{k+1}$ is allocated to the cell $C_d$.

The following equation is then satisfied for the first example:

$$SU_{j,k} + II_k = P_{a,k} + P_{b,k} + P_{j,k} + 0.01 \cdot P_{e,k-1} + 0.01 \cdot P_{d,k+1}.$$

Figure 4:
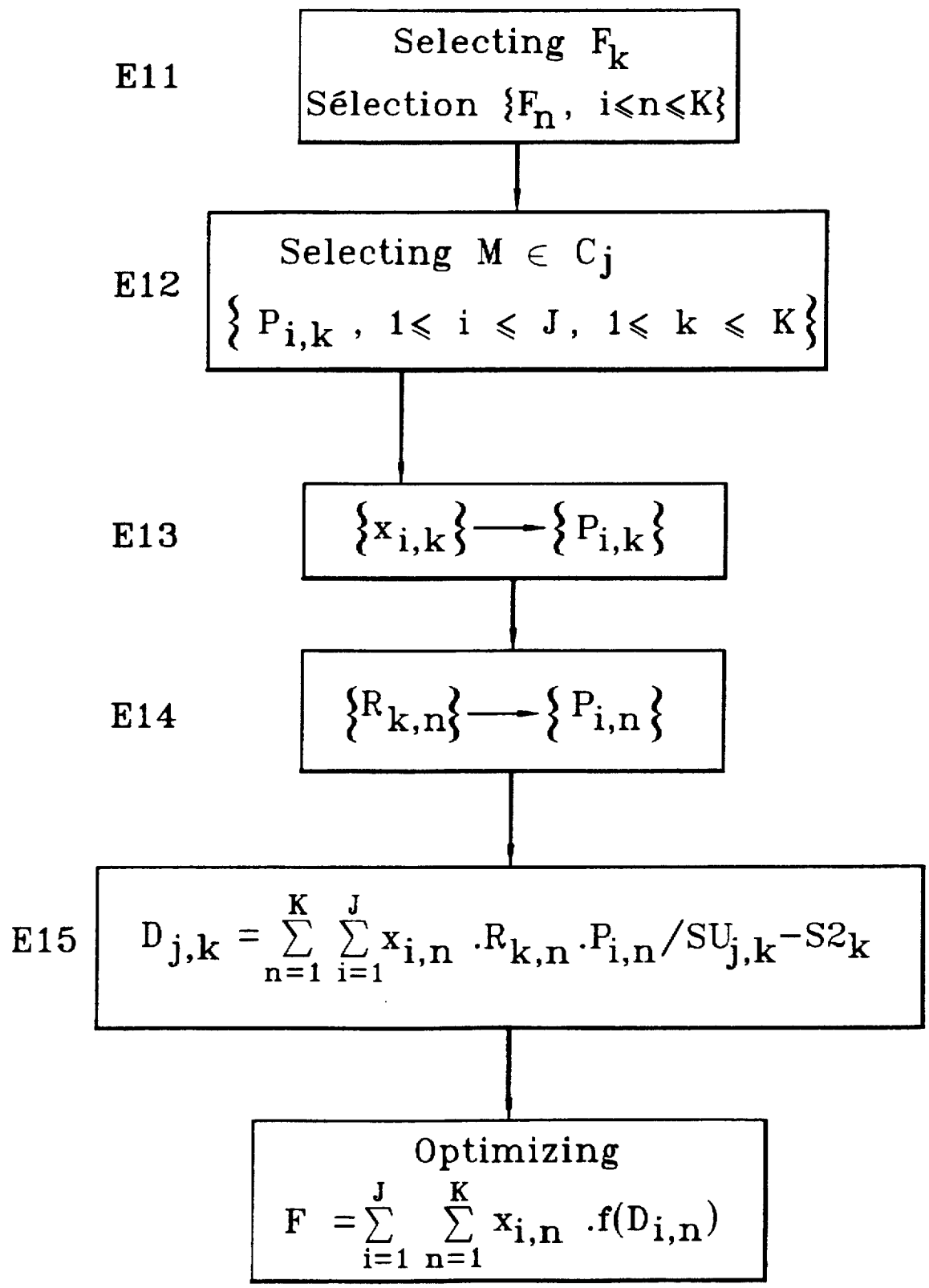
FIG. 4 shows an algorithm for modeling interference in a cellular radiotelephone network embodying a second embodiment of the invention.

Referring to FIG. 4, an interference modeling algorithm for the second embodiment of the invention has five steps E11 through E15.

Step E11 includes the selection of a first frequency $F_k$ in the spectrum and of a set of second frequencies $\{F_n\}$. For example, the set of second frequencies comprises all the frequencies allocated to the radiotelephone network RES.

Step E12 is the selection of a point M in the cell $C_j$ for which the propagation model supplies the signals $P_{1,1}$ through $P_{J,K}$ transmitted at the selected first frequency $F_k$ and at selected second frequencies from all the base stations of the radiotelephone network.

Step E13 assigns the coefficients $x_{1,1}$ through $x_{J,K}$ to the signals supplied by the propagation model respectively. As previously, the variable $x_{j,k}$ has the value 0 or 1.

In step E14 interference ratios $R_{k,1}$ through $R_{k,K}$ are allocated to the signals supplied by the propagation model respectively. An interference ratio $R_{k,n}$ depends on the difference between the first frequency $F_k$ and one $F_n$ of the second frequencies. The interference ratio $R_{k,n}$ is assigned to the signal $P_{i,n}$ for $1 \leq i \leq J$.

Step E15 multiplies the signals $P_{1,1}$ through $P_{J,K}$ supplied by the propagation model by the respective coefficients $x_{1,1}$ through $x_{J,K}$ and by the respective interference ratios $R_{k,1}$ through $R_{k,K}$, followed by the addition of all the products obtained. A predetermined threshold $S2_k$ is subtracted from the sum obtained in this way to determine if the coefficients $x_{1,1}$ through $x_{J,K}$ assigned in step E13 guarantee interference below the threshold $S2_k$.

As an alternative to this, step E15 further includes the division of the sum obtained by the useful signal $SU_{j,k}$ in the cell $C_j$, as in step E5 previously described.

In one variant of the second embodiment the step E15 includes calculation of the difference:

$$D_{j,k} = \left( \left(1 + \frac{I_{j,k}}{SU_{j,k}}\right) - S2_k \right).$$

A function $f(D_{j,k})$ is selected such that:
$f(D_{j,k})$ is close to 0 for $D_{j,k} \leq 0$, and
$f(D_{j,k})$ increases rapidly when $D_{j,k} \geq 0$
The function selected is, for example: $f(D_{j,k}) = e^{aD_{j,k}}$ where a is a strictly positive real number.
To optimize the frequency allocation plan for the network:
(i) the following function is minimized:

$$\sum_{i=1}^{J} \sum_{n=1}^{K} x_{i,n} \cdot e^{aD_{i,n}},$$

to minimize the interference;
(ii) the following function is maximized:

$$\sum_{i=1}^{J} \sum_{n=1}^{K} x_{i,n}(1 - e^{aD_{i,n}})$$

to maximize the traffic.

In a third embodiment, the sum of the signals received is averaged over a set of points $M_{j,1}$ through $M_{j,s}$ situated in the cell $C_j$, where S is a positive integer.

At a point $M_{j,s}$, where s is an integer lying between 1 and S, the useful signal emitted at the frequency $F_k$ by the base station $SB_j$ is denoted $SU_{j,k,s}$. The sum of the interference signals at the point $M_{j,s}$ emitted at the frequency $F_k$ from the base stations other than the base station $SB_j$ is denoted $I_{k,s}$. The propagation model at the point $M_{j,s}$ supplies signals $P_{1,1,s}$ through $P_{J,K,s}$ received at the point $M_{j,s}$ and emitted at the frequencies $F_1$ through $F_K$ by the base stations of the cells $C_1$ through $C_J$.

The sum of the interference due to the signals emitted at the frequency $F_k$ and the useful signal at frequency $F_k$, averaged over the points $M_{j,1}$ through $M_{j,s}$ in the cell $C_j$, is:

$$\left(1 + \frac{I}{SU}\right)_{mean} = \frac{1}{S} \cdot \sum_{i=1}^{J} x_{i,k} \cdot \sum_{s=1}^{S} \frac{P_{i,k,s}}{SU_{j,k,s}}$$

At the points $M_{j,1}$ through $M_{j,s}$ of the cell $C_j$, the average of the ratio of the sum of the interference due to the signals emitted at the frequency $F_k$ and the useful signal at frequency $F_k$ is expressed in the form of a linear function of variables $x_{i,k}$ with $1 \leq i \leq J$.

Figure 5:
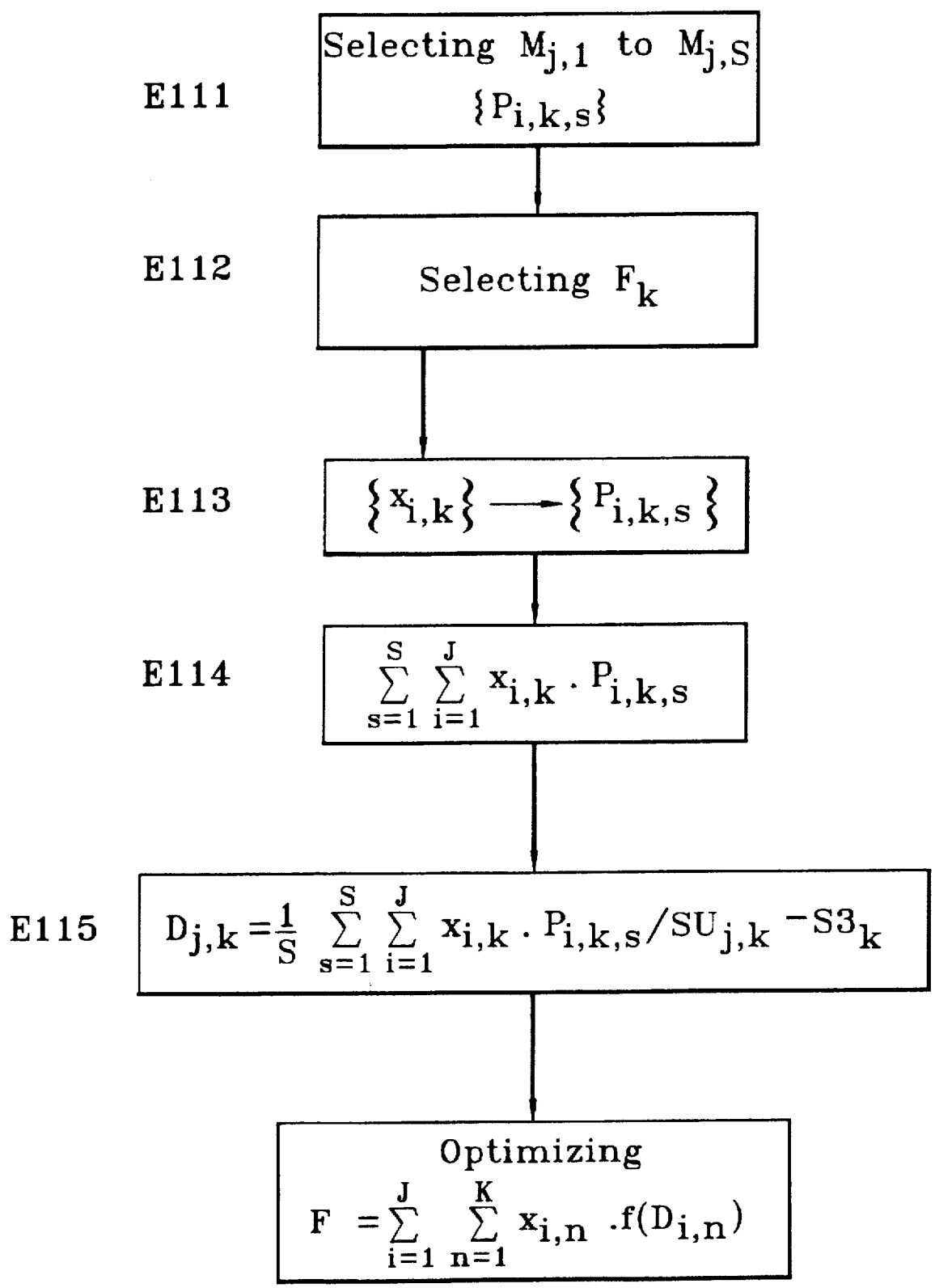
FIG. 5 shows an algorithm for modeling interference in a cellular radiotelephone network embodying a third embodiment of the invention.

Referring to FIG. 5, an interference modeling algorithm in the third embodiment has five steps $E_{111}$ through $E_{115}$.

Step E111 is the selection of the points $M_{j,1}$ through $M_{j,s}$, for example, distributed in the cell $C_j$ for which the propagation model provides the received signals $\{P_{i,k,s}, 1 \leq i \leq J, 1 \leq k \leq K \text{ and } 1 \leq s \leq S\}$ which are emitted from all the cells and at all the frequencies.

The step E112 is similar to the step E1 previously described (FIG. 2). The frequency $F_k$ is selected.

In step E113, coefficients $\{x_{i,k}, 1 \leq i \leq J\}$ are assigned to the signals $\{P_{i,k,s}, 1 \leq i \leq J \text{ and } 1 \leq s \leq S\}$. For a given cell $C_i$ the same coefficient $x_{i,k}$ with the value "0" or "1" is therefore assigned to S signals $P_{i,k,s}$. Alternatively, a coefficient is assigned to each signal $P_{i,k,s}$.

Step E114 calculates the sum:

$$\sum_{s=1}^{S} \sum_{i=1}^{J} x_{i,k} \cdot \frac{P_{i,k,s}}{SU_{j,k,s}}$$

Step E115 is a calculation of the arithmetical mean of the above sum, from which a predetermined threshold $S3_k$ is subtracted. This verifies if the assignment of the coefficients $\{X_{i,k}\}$ in step E113 limits interference to a value below the threshold $S3_k$.

The difference $D_{j,k}$ obtained contributes to establishing the optimization criterion as in the first and second embodiments.

In the above third embodiment, the mean calculated is an arithmetical mean. As an alternative to this, the mean calculated is a mean for the coefficient p, where p is a positive real number:

$$\left(1 + \frac{I}{SU}\right)_{mean}^{p} = \sum_{i=1}^{J} x_{i,k} \cdot \left[ \frac{1}{S} \cdot \sum_{s=1}^{S} \left(\frac{P_{i,k,s}}{SU_{j,k,s}}\right)^{p} \right]^{1/p}$$

In particular, if $$p = 2, \left(1 + \frac{I}{SU}\right)_{mean}^{2}$$

is a quadratic mean, and if $$p = +\infty, \left(1 + \frac{I}{SU}\right)_{mean}^{+\infty}$$

is equal to the maximal value of interference at the points $M_1$ through MS of the cell $C_j$:

$$\max_{1 \leq s \leq S} \left( \sum_{i=1}^{J} x_{i,k} \cdot \frac{P_{i,k,s}}{SU_{j,k,s}} \right).$$

As an alternative, the interference taken into account is not only the interference due to the signals at frequency $F_k$. The interference due to all the frequencies $F_1$ through $F_k$ of the spectrum allocated to the radiotelephone network RES is also considered.

The mean of the ratio of the sum of the interference due to the frequencies $F_1$ through $F_k$ and the useful signal at the frequency $F_k$ is:

$$\left(1+\frac{I}{SU}\right)_{mean} = \frac{1}{S} \sum_{n=1}^{K} \sum_{i=1}^{J} \sum_{s=1}^{S} x_{i,n} \cdot \frac{R_{k,n} \cdot P_{i,n,s}}{SU_{j,k,s}}.$$

In other embodiments the interference is averaged over a set of points that are distributed across a plurality of adjacent cells to obtain a mean interference for these adjacent cells, or the interference is averaged over all of the cells of the network.

In practice the frequency allocation problem is directed to a target to be achieved dependent on a "cost" function that combines interference constraints and traffic requirements in the cells that must be complied with. The solution of the problem is the allocation plan expressed in the form of the set $\{X_{j,k}, 1 \leq J, 1 \leq k \leq K\}$.

The target is chosen from, for example:

maximizing total effective traffic TTE in a cellular radiotelephone network, minimizing interference, minimizing a number NFU of frequencies used in the network, or maximizing a spectral efficiency ES.

For example, the total effective traffic TTE is:

$$TTE = \sum_{j=1}^{J} \sum_{k=1}^{K} r_{j,k} \cdot x_{j,k}$$

where $r_{j,k}$ is a function of a difference $D_{j,k}$ between the interference at the frequency $F_k$ for the cell $C_j$ and a predetermined threshold.

The function $r_{j,k}$ varies as a function of $D_{j,k}$ between 0 and 1, tends towards 1 when the variable $D_{j,k}$ tends towards $-\infty$, i.e. when the interference at the frequency $F_k$ for the cell $C_j$ is very low, and towards 0 when the variable $D_{j,k}$ tends towards $+\infty$, i.e. when the interference at the frequency $F_k$ for the cell $C_j$ is very high.

Figure 6:
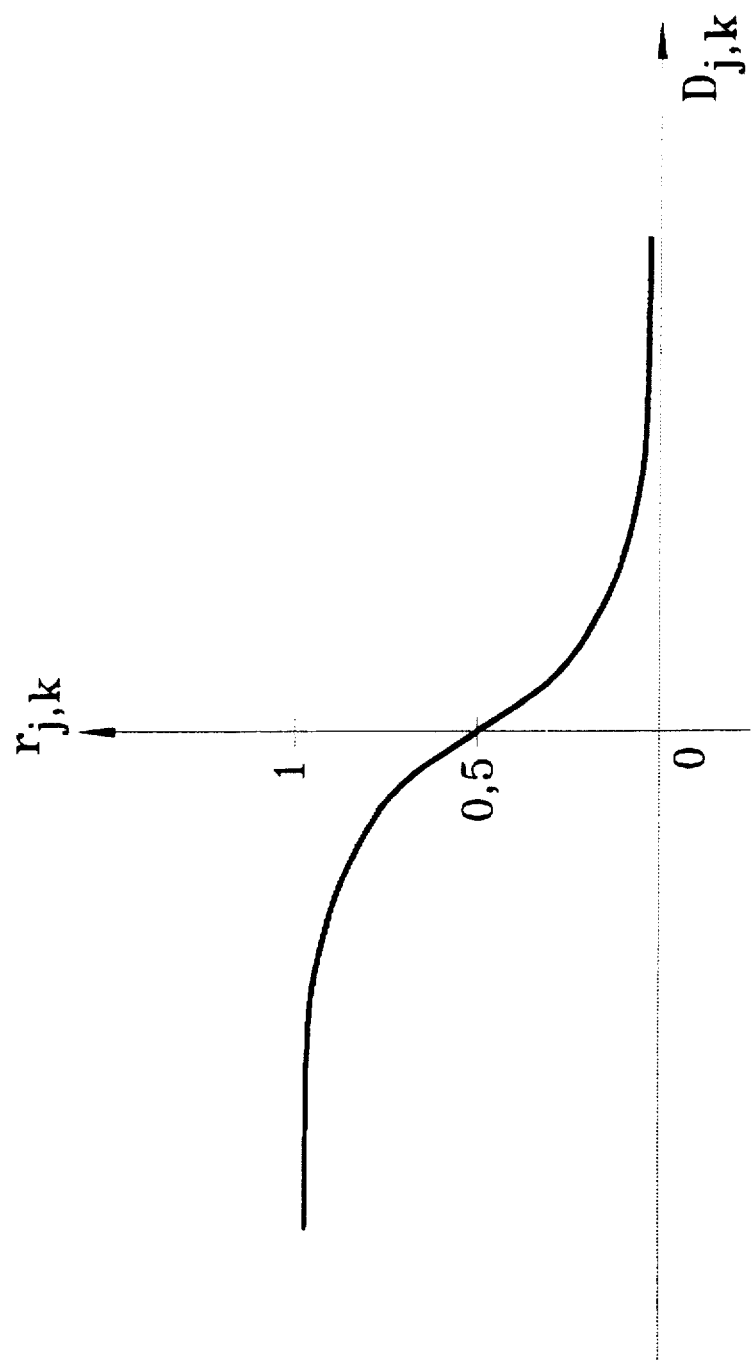
FIG. 6 is a function diagram used to estimate traffic in the cellular radiotelephone network.

The function $r_{j,k}$ shown in FIG. 6 is, for example:

$$r_{j,k}(D_{j,k}) = \frac{1}{2}[1 - \tanh(D_{j,k})]$$

in which tanh denotes the hyperbolic tangent.

The process of interference minimization is effected, for example, on a mean interference calculated for all the cells $C_j$ and for all the frequencies $F_k$ such that the associated coefficient $x_{j,k}$ is equal to 1.

The spectral efficiency ES is:

$$ES = \frac{TTE}{NFU}$$

The constraints to be complied with are:

minimizing interference, for example the mean power level received per cell, for all the cells $C_1$ through $C_j$ of the network and all the frequencies $F_1$ through $F_k$ of the spectrum;

assigning sufficient frequencies per cell to handle all the traffic:

$$\sum_{k=1}^{K} x_{j,k} \geq NFC_j \; 1 \leq j \leq J$$

where $NFC_j$ is an integer equal to the minimum number of frequencies to be allocated to the cell $C_j$;

choosing the variables $x_{j,k}$ such that:

$$x_{j,k} \in \{0,1\} \text{ for } 1 \leq j \leq J \text{ and } 1 \leq k \leq K.$$

What I claim is:

1. A method of modeling interference in a cellular radiotelephone network having cells served by respective base stations, wherein a frequency spectrum comprising a finite number of frequencies is allocated to said network and a propagation model indicates radio signals respectively emitted at each frequency of said spectrum from said base stations of said network and received at a point of said network, said method comprising:

selecting a selected frequency in said spectrum allocated to said cellular radiotelephone network, selecting in said network a selected point for which said propagation model is determined, assigning respective coefficients to the radio signals at the selected frequency received at the selected point, one of said coefficients being equal to 1 if said selected frequency is allocated to a base station emitting a respective one of said radio signals, and equal to 0 otherwise, multiplying said radio signals at said selected frequency received at said selected point by the respective coefficients into respective products, and summing said respective products to yield an interference model.

2. A method as claimed in claim 1 further comprising dividing said interference model by said signal emitted at said selected frequency from said base station serving said selected point of said network.

3. A method of modeling interference in a cellular radiotelephone network having cells served by respective base stations, wherein a frequency spectrum comprising a finite number of frequencies is allocated to said network and a propagation model indicates radio signals respectively emitted at each frequency of said spectrum from said base stations of said network and received at a point of said network, said method comprising:

(a) selecting a first selected frequency and second selected frequencies in said spectrum allocated to said cellular radiotelephone network, (b) selecting in said network a selected point for which said propagation model is determined, (c) for each of said first selected frequency and second selected frequencies:

assigning coefficients respectively to the radio signals at said each selected frequency received at the selected point, each said respective coefficient being equal to 1 if said each selected frequency is allocated to a base station emitting a respective one of said radio signals, and equal to 0 otherwise, multiplying said radio signals at said each selected frequency received at said selected point by the respective coefficients into respective products, and summing said respective products to derive a first interference model.

(d) assigning interference ratios respectively to the first interference models respectively derived for said first and second selected frequencies, said interference ratio relative to a respective first interference model being a function of the difference between said first selected frequency and the respective second selected frequency, except for the interference ratio relative to said first selected frequency which is equal to 1, (e) multiplying said first interference models respectively by the interference ratios into model products, and (f) summing said model products to yield a second interference model.

4. A method of modeling interference in a cellular radiotelephone network having cells served by respective base stations, wherein a frequency spectrum comprising a finite number of frequencies is allocated to said network and a propagation model indicates radio signals respectively emitted at each frequency of said spectrum from said base stations of said network and received at a point of said network, said method comprising:

(a) selecting a selected frequency in said spectrum allocated to said cellular radiotelephone network, (b) selecting plural selected points in said network situated in the same cell, propagation models being respectively determined for said selected points, (c) for each said selected point:

assigning respective coefficients to the radio signals at the selected frequency received at the selected point, one of said coefficients being equal to 1 if said selected frequency is allocated to a base station emitting a respective one of said radio signals, and equal to 0 otherwise, multiplying said radio signals at said selected frequency received at said selected point by the respective coefficients into respective products, and summing said respective products to derive a first interference model, and (d) averaging the first interference models respectively derived for said selected points to yield a second interference model.

5. The method claimed in claim 4 wherein said averaging step includes calculation of an arithmetic mean of said first interference models respectively derived for said plural selected points.

6. The method claimed in claim 4 wherein said averaging step includes calculation of a quadratic mean of said first interference models respectively derived for said plural selected points.

* * * * *